(12) United States Patent
Perkins et al.

(10) Patent No.: US 7,928,409 B2
(45) Date of Patent: Apr. 19, 2011

(54) REAL-TIME, ACTIVE PICOMETER-SCALE ALIGNMENT, STABILIZATION, AND REGISTRATION IN ONE OR MORE DIMENSIONS

(75) Inventors: Thomas T. Perkins, Boulder, CO (US); Gavin M. King, Boulder, CO (US); Ashley R. Carter, Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 1167 days.

(21) Appl. No.: 11/545,498

(22) Filed: Oct. 11, 2006

(65) Prior Publication Data

US 2010/0257641 A1 Oct. 7, 2010

Related U.S. Application Data

(60) Provisional application No. 60/725,203, filed on Oct. 11, 2005.

(51) Int. Cl.
*G03F 9/00* (2006.01)

(52) U.S. Cl. .............. 250/491.1; 850/9; 850/12

(58) Field of Classification Search ........... 250/491.1
See application file for complete search history.

(56) References Cited

U.S. PATENT DOCUMENTS

| 3,284,975 A | 11/1966 | Averill | |
|---|---|---|---|
| 5,486,919 A * | 1/1996 | Tsuji et al. | 356/484 |
| 6,718,821 B1 * | 4/2004 | Houston et al. | 73/105 |
| 6,806,477 B1 * | 10/2004 | Saito et al. | 250/491.1 |
| 2006/0215171 A1 * | 9/2006 | Nakata et al. | 356/487 |

OTHER PUBLICATIONS

Winfried, Denk and Watt W. Webb, "Optical measurement of Picometer Displacements of Transparent Microscopic Objects", Applied Optics, vol. 29, No. 16, pp. 2382-2391, Jun. 1, 1990.
King, Gavin M., The Dynamic Structural Biology of Ion Channel Proteins: An Ultra-Stable Atomic Force Microscope Study.
A. Pralle, Prummer, M., Florin, E.-L., Stelzer, E.H.K. and Hörber, J.K.H., "Three-Dimensional High-Resolution Particle Tracking for Optical Tweezers by Forward Scattered Light," Wiley-Liss, Inc., Microscopy Research and Technique, vol. 44, pp. 378-386, 1999.
Capitanio, M., Cicchi, R., and Pavone, F.S., "Position Control and Optical Manipulation for Nanotechnology Applications", the European Physical Journal B, vol. 46, pp. 1-8, 2005.
Sun, Changming and Wu, Xiaoliang, "A Method for Automatic Segmentation of Fiducial Marks," Research Index, Aug. 15, 2006.

* cited by examiner

*Primary Examiner* — Phillip A Johnston
(74) *Attorney, Agent, or Firm* — Novak Druce & Quigg LLP

(57) ABSTRACT

A method and apparatus for aligning, stabilizing and registering two or more structures in one or more dimensional space with picometer-scale precision. Low noise laser light is scattered by at least one or more structure or fiducial marks. One mark may be coupled to each structure to be positioned. The light which has been scattered off the fiducial marks is collected in a photo-sensitive device which enables real-time high-bandwidth position sensing of each structure. One or more of the structures should be mounted on a stage, and the stage can move in either one or more dimensions. The photo-sensitive device generates signals in response to the scattered light received, and the signals are used to modulate the position of the stage in a feedback loop.

18 Claims, 8 Drawing Sheets

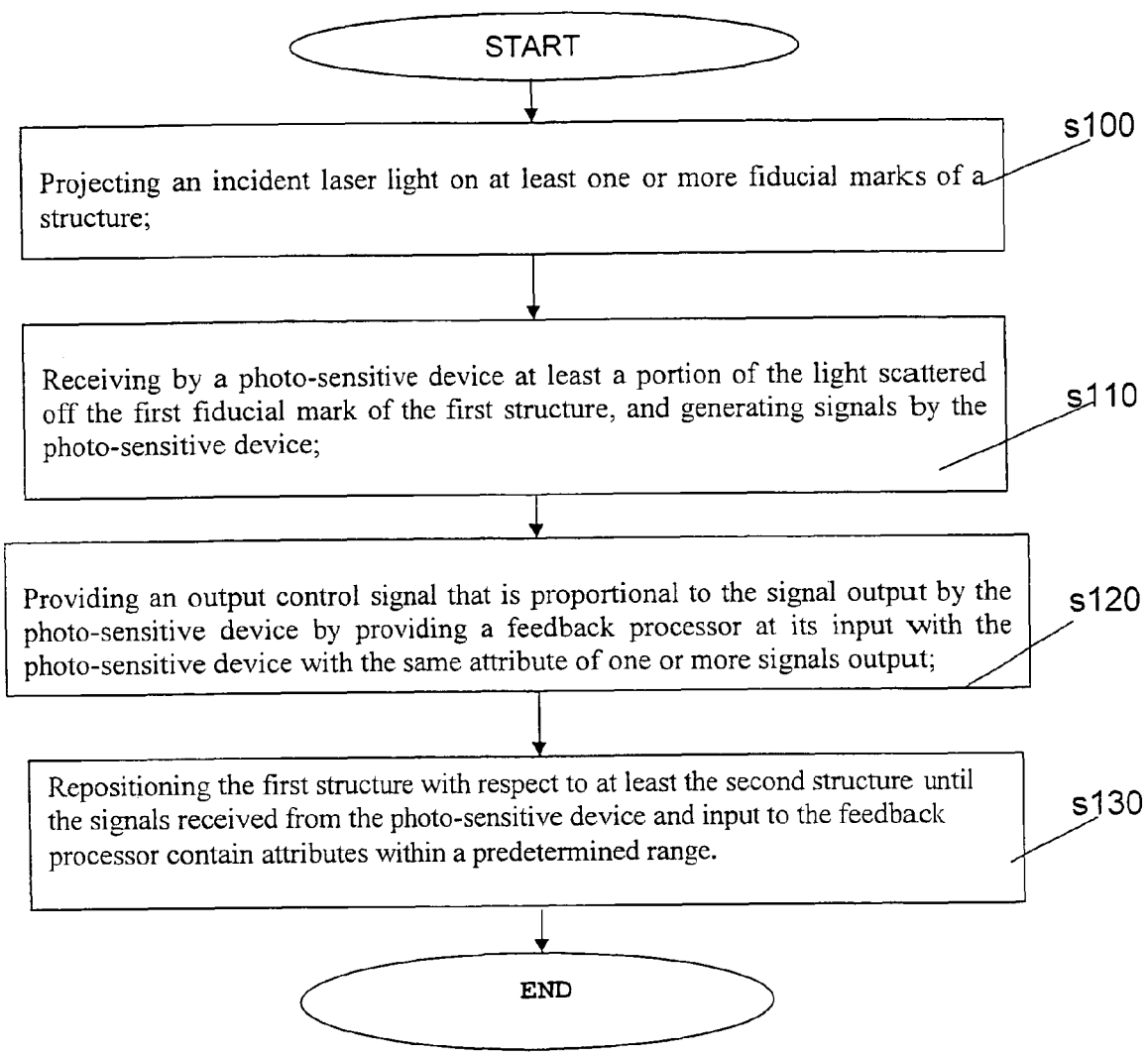

REAL-TIME, ACTIVE PICOMETER-SCALE ALIGNMENT, STABILIZATION, AND REGISTRATION IN ONE OR MORE DIMENSIONS

This application claims priority from provisional application 60/725,203 filed Oct. 11, 2005, and the contents of which are incorporated by reference in its entirety.

BACKGROUND OF THE INVENTION

1. Field of the Invention

The present invention relates to the use of light to position and stabilize structures, including but not in any way limited to the fields of scanning probe microscopy, Atomic Force Microscopy (AFM), optical microscopy, local probe lithography, semiconductor patterning including semi-conductor wafer and mask alignment, and operating optical tweezers. More particularly, the present invention relates to the use of real-time alignment and stabilization of structures at a picometer-scale level.

2. Description of the Related Art

There is a problem in the art with drift. In fields such as optical microscopy and semiconductor characterization, where it is highly desirable to achieve accurate positioning and stabilization, there has been a long-standing problem with various methods of alignment and stabilization, particularly for mechanically independent structures. Typically, after positioning and aligning two structures relative to each other, there will subsequently be some drift (e.g. due to thermal expansion of the microscope's body). For example in optical microscopy, there is drift of the objective focusing mechanism of the microscope. Moreover, since most optical microscopes have a tendency to be more sensitive to drift prior to magnification, it is the motion of the objective relative to the sample that is typically the major source of drift.

In laser-based tracking methods, apparent drift can further be caused by laser noise. Various types of noise adversely impact aligning and stabilizing methods. For example, there are known problems with pointing noise, intensity noise, polarization noise and mode noise. To reiterate, all of these types of noise have adversely impacted alignment, stabilization and registration. There is a need in the art for a method and system of alignment, stabilization and registration that minimizes apparent or real drift caused by such laser noise sources.

The issue of instrumental drift in the scanning probe microscopy (SPM) field has been identified and discussed for a number of years. In attempting to overcome this limitation, previous researchers have presented a handful of stabilization approaches, the most promising and commercially popular of which involve mechanical dithering (i.e. lateral oscillation) of the tip or sample. In this so-called "tracking mode", the tip is often locked to one particular surface feature, thereby forfeiting normal lateral scanning (e.g., imaging). Additionally, the lateral oscillation (typical amplitude 0.5 nm) reduces microscope resolution. This is discussed in the paper Pohl D W, Moller R. Tracking Tunneling Microscopy. Review of Scientific Instruments 1988;59 (6):840-2.

As disclosed in *An Ultra Stable Scanning Probe Microscope*, by Ashley R Carter in the lab of Thomas T. Perkins, PI NanoInnovation grant (see Appendix A, Submitted Mar. 31, 2006), which provides background information and is incorporated by reference in its entirety, discusses in part Scanning Probe Microscopy (SPM) and long time-scale scanning or stationary hovering of the tip above a point of interest being required for imaging 1D objects (nanotubes) and in probing zero-point objects including complex protein structures, nanopores, or quantum dots. Such applications involve researchers using various methods to overcome drift that require repeated fast scans or mechanically dithering the tip. There is a need in the art for a system and method of stabilizing an SPM tip that does not require tip movement or oscillation.

There are also problems achieving stabilization with an Atomic Force Microscope (AFM). In the prior art, there are known problems aligning and stabilizing the tip relative to the sample. For example, see a paper by Gavin King and Jene Golovchenko *Probing Nanotube-Nanopore Interaction* Physical Review Letters, vol. 95, 216103 (2005). The prior art techniques is further discussed in this paper and references therein.

However, dithering the probe has drawbacks because it sacrifices resolution and only gives a relative position as opposed to an absolute position.

In addition, with regard to optical systems, it is known that a large optical system can have higher resolving capability and by using a shorter wavelength there can be less diffraction. A near perfect optical system is defined by the diameter of the optics and the wavelength of interest. Optical imaging of smaller and smaller images, such as biological systems, can resolve features down to 16 nm, which is well below the diffraction limit of approximately 220 nm. Additionally, localization of a single structure is not limited by the Rayleigh criterion (e.g. criterion for how finely a set of optics may be able to distinguish the location of two objects which are near each other, beginning with the assumption that the central ring of one image should fall on the first dark ring of another image) and has been widely used in single molecule experiments to resolve nanometer-scale motion of beads, fluorophores, and organelles. Accordingly, as the measurements resolve ever decreasing distances, there is an increase in the criticality of unwanted physical drift.

There is a new generation of sophisticated optical microscopes that are used for studying a single molecule which employ closed-loop piezo-electric transducer (PZT) stages. While such stages have an effective internal measurement of the position of their drift (about a nanometer) in three dimensions, they do not compensate for drift caused from thermal expansion between the sensors and the sample plane. This does not provide a local measurement of drift.

In addition, there have been attempts to resolve the location of a 4.5 um bead affixed to a cover slip (to about 10 nm vertically and about 1 nm horizontally at 25 Hz) by analyzing video images of a bead's diffraction rings. This technique is computationally intensive and requires the image plane to be defocused so that diffraction rings can be observed.

Moreover, a similar approach with 200 nm fluorescent beads has been used to achieve resolution of about 1 nm in three dimensions (3D) at 0.5 Hz. The beads are physically attached to a sample, but will still wiggle in the ~1 nm range in 3D. However, this technique, in addition to being computationally intensive, also requires post-processing of the data, thus preventing real-time stabilization.

There is disclosed a feedback system whereby the image from a high magnification camera (200×) is first acquired by the digitalizing board on a PC, and then the position of the bead is calculated along the x, y and z directions and if the position changes with time, there are piezoelectric translators which are driven in order to correct the displacement.

Some of the relevant issues regarding stuck bead and video microscopy are discussed in a paper by M. Capitiano, R. Cicchi and F. S. Pavone entitled *Position Control and Optical Manipulation for Nanotechnology Applications*, European Physical Journal, published online 8 Aug. 2005, © EDP Sciences, Societa Italiana di Fisca, Springer-Verlag 2005, which is incorporated by reference in its entirety as background material, discloses the use of stuck bead and video microscopy to stabilize an optical microscope to ~1 nm in 3D.

For example, Capitiano discloses at page 7, left column, a test on a nanoscopic system on a single bio-molecule assay constituted by a myosin molecule interacting with an actin filament. In an experimental assay, a single actin filament is suspended between two polystyrene beads (1.1 um in diameter) and presented to a myosin molecule bound to a glass bead (1.54 um) in diameter. Attachment between the beads and the actin filament is achieved using biotinlated actin and neutra-avidinated beads. The glass bead is used as a reference for a feedback system to maintain a 1 nm position between the actin and the myosin.

In the state of the art alignment using micron-sized beads as structures suffers from the nanometer scale motion of these beads relative to the sample as discussed by Ashley R. Carter, Gavin M. King, Theresa A. Ulrich, Wayne Halsey, David Alchenberger, and Thomas T. Perkins in *Stabilization of an optical microscope to 0.1 nm in 3D*, Applied Optics, published online 28 Sep., 2006 DOI 72836

While it has been known for some time that it is possible that a laser light scattering a bead could achieve picometer-scale stabilization (please see *Optical Measurement of Picometer Displacements of transparent microscopic object*, by Winifried Denk and Watt W. Webb, Applied Optics, vol. 29, No. 16, Jun. 1, 1990, the contents of which are herein incorporated by reference in its entirety as background material) heretofore such an achievement still had problems with low frequency noise of the laser that was not overcome. Moreover, the placing of fiducial marks was not practical.

Accordingly, there is a need in the art for real-time active picometer-scale alignment, stabilization, and registration in one or more dimensions.

There is also a need in the art to improve the methodologies in semi-conductor processing using optical equipment to align the mask and sample.

SUMMARY OF THE INVENTION

The present invention actively decreases drift and can be used to generate picometer-scale alignment, stabilization and registration. The technique typically includes the fabrication of fiducial marks that are rigidly attached to the sample. Optical signals are then generated by scattering a laser off this fiducial mark. The laser needs to have ultra-low noise characteristics which are typically achieved by active feedback but this method is by no means limiting. There can be an alignment of two or more independent structures relative to each other, or relative to a shift of a known center, or the structures can be raster scanned with respect to each other.

For example, to align a structure, it is translated through the laser beam to generate a calibration curve. By one of various methods, the center of that structure can be chosen and called 0. One can then move one structure 10.1 nm relative to the other structure (e.g., a lens) by moving either structure 10.1 nm. The calibration curve can also be attained by moving the laser beam through the structure.

The present invention also provides in part an optical stabilization method which maintains full scanning functionality of the scanning probe microscopy and does not require dithering. In addition, with regard to AFM, the stabilization method can be practiced in ambient temperatures with picometer-scale long-term stabilization.

According to the present invention, a method for stabilization of one or more structures relative to another one or more structures includes using fiducial marks that are embedded in the structure unless some of the structures by nature may not require the embedding of such a mark. For example, if a sample and lens are two structures being aligned, then the sample has a fiducial mark embedded in it, and the lens by its nature does not need a fiducial mark. In the case of stabilizing an AFM tip to the sample, then there are three structures (the sample, AFM tip, and lens) to be stabilized. The sample has a fiducial mark, the lens does not, and the AFM tip may or may not act as the fiducial mark. Then the sample and AFM tip are stabilized relative to a lens.

The present invention can be used, inter alia, with Atomic Force Microscopy.

One aspect of the optical stabilization method of the present invention includes a long term picometer-scale tip sample registration in 3D. This registration is an improvement over previous attempts at stabilizing and scanning a probe instrument, which at best were only able to achieve one dimension (z) (i.e. normal) to the scan direction) stabilization, and were not sensitive to picometer-length-scale displacements and did not directly measure the tip rather the cantilever (see paper by Sparks A W and Manalis S R. *Atomic force microscopy with inherent disturbance suppression for nanostructure imaging* Nanotechnology 2006: 17:1574-79).

In addition, the present invention discloses a technique that is a novel and nonobvious improvement than the aforementioned PZT stages of the prior art previously because the present invention includes a local measurement of drift, and also provides improved resolution over the PZT stages.

The invention provides a process for positioning two or more structures to picometer-scale precision over short (typically approximately 0.01 s) and long (typically approximately >100 s) time scales. In addition, the invention also provides a method for picometer-scale alignment, which will greatly benefit apparatuses such as optical tweezers (optical tweezers make use of a laser beam to provide an attractive force (in the range of piconewtons to femtonewtons) to physically move microscopic objects (on the order of nanometers to tens of micrometers in diameter) with high precision).

According to another aspect of the invention, a method for providing a one, or more dimensional positional stabilizing technique is particularly effective when used with structures that either contain a fiducial mark that is firmly coupled to the sample, or can also be an inherent property that interacts with light to act as though it is a fiducial mark (e.g. a lens or a rough surface) is present. The fiducial mark (or inherent property) is required to scatter a detectable amount of incident light. Alternatively, when the structure is a lens, a focusing of incident light occurs. Thus, in the case of a lens, the focusing of incident light from at least a portion thereof is generally inherent and normally does not require a purposely made fiducial mark.

According yet another aspect of the present invention, a single laser beam can be used for the alignment, stabilization and registration of more than one structure. For example, one laser beam can measure the lens and the fiducial mark on the sample. Or one laser beam might be split to measure one fiducial mark on one sample, one fiducial mark on another sample (say a mask), and the lens. The signals on the position sensing device might be convolved but they can always be deconvolved.

According to the present invention, the focused laser light scatters off the mark and can be detected in transmission or reflection geometries by detecting either forward or backscattered light respectively. There are one or more photo-sensitive detectors (e.g. quadrant photo diode, position sensitive detector, charge coupled device). The photo-sensitive device, in response to receiving the scattered light, outputs signals which reveal the position of each fiducial mark, and hence the position of each structure. These signals are used in a feedback loop to keep the differential position stable, or to permit the precise scanning of the position between the two structures.

According to an aspect of the invention, a method for aligning at least two or more structures at picometer-scale precision, comprises the steps of:

(a) projecting an incident coherent light on at least one or more fiducial marks of a first structure to scatter light off of at least a first fiducial mark of the first structure; (b) receiving by a photo-sensitive device at least a portion of the light scattered off the first fiducial mark of the first structure, said photo-sensitive device converting the received scattered light into one of electrical or optical signals; (c) providing an output control signal that is related to the signal output by the photo-sensitive device by providing a feedback algorithm or processor over predetermined time interval; and (d) repositioning the first structure with respect to at least the second structure until the signals received from the photo-sensitive device and input to the feedback algorithm or processor contain attributes within a predetermined range such that an amount of separation between at least the first structure and the second structure is within a picometer-scale precision.

A system for aligning, stabilizing and registering at least two mechanically independent structures includes: a light source for providing coherent light to be incident on at least one fiducial mark of at least one structure of said two or more structures; a photo-sensitive device for receiving at least a portion of the light scattered off said at least one structure, wherein said photo-sensitive generates a signal in response to the scattered light received; a positioner adapted for movement in the picometer-scale range, wherein said positioner can be moved in accordance with the signals generated by the photo-sensitive device's reception of scattered light from the fiducial marks, so that said at least two mechanically independent structures are at least one of (1) aligned with picometer-scale precision; and (2) arranged at a differentially stable position for a predetermined amount of time; and a feedback loop to provide a control signal that controls movement of said positioner, the feedback loop including a feedback algorithm or processor to provide an output signal related to a characteristic of the input the signal generated by the photo-sensitive device and received by the feedback loop, the positioner being moveable to provide one of: (1) alignment of the two mechanically independent structures at said position within the picometer-scale precision; and (2) to stabilize a position of said at least one structure for a predetermined period of time.

The related characteristic of the signal used for feedback purposes can be proportional, differential gain, integral gain, or any other mathematical relationship that can be used to provide a feedback loop.

It should be noted that the present invention can be used in commercial applications such as:

(1) optical trapping stabilization;
(2) optical imaging stabilization;
(3) long time course confocal microscopy stabilization; and
(4) scanning probe microscopy applications which further include:
  (a) atomic scale lithography with an SPM tip: single atom/single molecule positioning and patterning via the SPM tip, which not currently possible at room temperature. Currently, researchers use ultra low temperatures (4 K);
  (b) high precision dip-pen lithography;
  (c) Probing solid-state nanopores-deterministic translocation and nucleic acid sequencing-full. For example, perfect tip-pore alignment where the tip is translocating a biomolecule (e.g. ssDNA, ssRNA) through a pore;
  (d) 3D Stabilization at zero or near zero force feedback;
  (e) high precision molecular structure studies such as protein unfolding.
  (f) molecular electronic studies—highly stable instrument enables high fidelity I-V spectroscopy and electronic structure measurements;
  (g) near field scanning optical microscopy (NSOM)—use of IR detection wavelengths are desirable so as not to interfere with optical fields under study;
  (h) scanning applications where long time scale stability is critical (e.g., time elapsing imagery-molecule or atom diffusion, biological processes, functional cellular imaging);
  (i) scanning applications where suspended structures are encountered, e.g., STM/AFM of suspended carbon nanotubes and nanowires. Force feedback tends to zero use optical signal for z height of tip;
  (j) high precision force (and I-V) spectroscopy
  (k) Tip sample interactions while "hovering" over a precise location in space. Will be particularly useful for studies of sparsely dispensed species (e.g., molecules) on a substrate surface.

In all of these cases one or more fiducial marks can be an integral part of the substrate surface. The local probe tip itself (or mark embedded close to the tip) can then act as the other fiducial. This yields a local real time differential measure of the tip-sample position and can be used in a feedback loop to minimize drift. All scanning probe studies are surface coupled. Thus, the use of optical stabilization is particularly valuable for such studies. As the use of a transmission microscope geometry may limit the ability to probe a surface, reflection geometry (i.e., collection of backscatter laser light) is especially useful for SPM studies. Note that the wavelength of laser light used can be chosen to penetrate optically opaque substrates (e.g., silicon);

It is proposed here that an optically stabilized AFM will be able to image a sample at a high resolution and maintain atomic-scale registration between the tip and the sample.

The proposed optically stabilized AFM optically stabilized will have the ability to "hover" an AFM tip over specific regions of interest (such as protein domains) with picometer-scale stability for long time periods.

One proposed implementation, which is in no way limiting, is for the proposed optically stabilized AFM microscope to integrate a customized inverted optical microscope with an AFM. Two independently steered laser beams are focused to show diffraction limited spots by a high NA objective lens placed below the sample plane.

(5) semiconductor patterning and processing applications, including:

(a) mask aligners—minimal overlay error processing where multilayer alignment is critical, thick resist processing where long exposure times necessitate nanometer scale stabilization, economic mask (non-quartz) processes where thermal expansion becomes more prevalent.
(b) mask makers;
(c) nanoimprint lithography.

Here, a real time differential measure of the substrate surface and patterning mask can be enabled by monitoring scattering from fiducial marks on both elements. In one embodiment used for a typical projection lithography process, one laser beam is incident upon the imaging lens from below and exposure radiation is incident from above. For the purpose of this example, the substrate is situated above a lens and the mask is situated above the substrate. The laser beam from below would focus on the fiducial mark of the substrate and this laser (or a second laser beam) could interact with the fiducial mark in the mask. As described previously, the scattered light could be detected either with forward or backscattered detection and electronically processed. The position of one (or both) structures can then be varied so as to maintain a constant alignment and separation in one or more dimensions (e.g. x, y, & z) during the exposing processing step(s). This position can also be scanned precisely as is typical in stepping lithography. For multiple layer processes, the fiducial marks can be aligned accurately by iteratively scanning the position of both structures. Importantly, all alignment, stabilization and registration methods described here are high bandwidth active processes which can yield picometer-scale precision and stability even in the presence of external fluctuations (e.g., temperature fluctuations, mechanical vibrations and acoustic noise).

BRIEF DESCRIPTION OF THE DRAWINGS

For purposes of illustration and not intended to limit the scope of the invention in any way, the aforementioned and other characteristics of the invention will be clear from the following description of a preferred form of the embodiments, given as non-restrictive examples, with reference to the attached drawings wherein:

FIG. 1 is flowchart providing an overview of a method according to the present invention;

DETAILED DESCRIPTION OF THE INVENTION

It is understood by a person of ordinary skill in the art that the drawings are presented for purposes of illustration and not for limitation. The embodiments shown and described herein do not encompass all possible variations of the arrangement of structure or the type of substances that can be quantified thereby. Therefore, an artisan appreciates that many modifications can be made within the spirit of the invention and the scope of the appended claims than the illustrative examples shown and described.

FIG. 1 provides an overview of a method of aligning two or more mechanically independent structures in time according to the present invention. At step 100, positioning two or more mechanically independent structures that are marked with at least one fiducial mark on each structure. At step 110, scattering a laser light beam against the at least one fiducial mark. At step 120, a photo-sensitive device positioned relative to the independent structures reads the scattered light and converts the reading into electrical signals. At step 130, the signals are provided are to a feedback algorithm or processor (e.g. a feedback loop, feedback processor) to create an output related to the input signal from the photo-sensitive device. If the signals are not within a certain limit, then at step 140 the position of at least one of the independent structures is varied to make the separation between the two or more mechanically independent structures such that the electrical signals are within the limits of the desired value. If the signal is within a desired threshold, the positioning remains unchanged. The laser light will be scattered off the two or more mechanically independent structures either continuously or within certain predefined intervals to ensure that the separation between the structures does not vary within predefined limits.

It should be understood that the feedback does not have to be proportional, and there can be a feedback algorithm that is, for example integral gain, differential gain, etc.

Figure 2A:
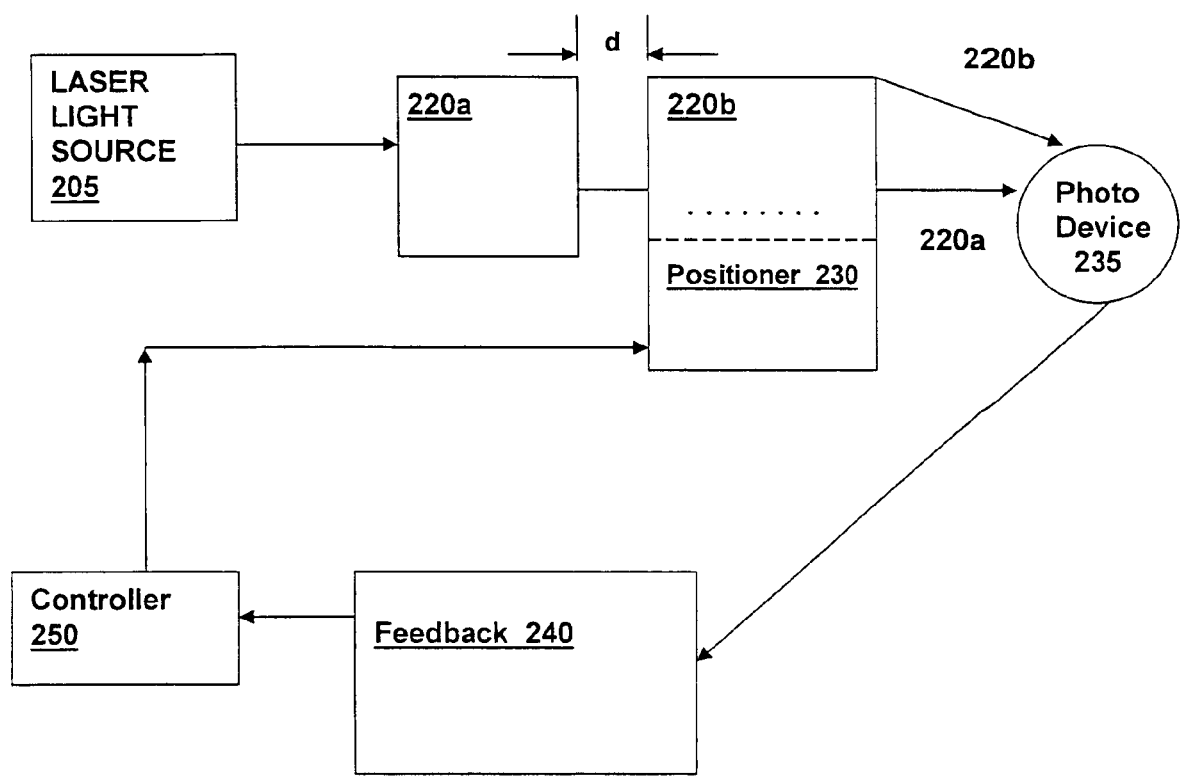
FIG. 2A provide a schematic of a feedback apparatuses according to the present invention.
Figure 2B:
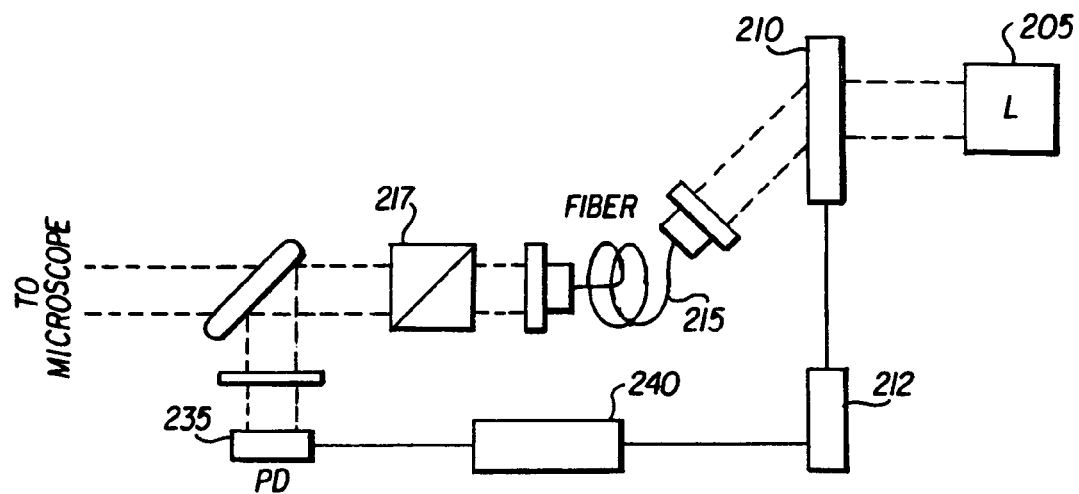
FIG. 2B provides a schematic of a laser stabilization system.

FIGS. 2A and 2B show a schematic of an apparatus for aligning and/or stabilizing a relative position of at least two or more mechanically independent structures at picometer-scale distances. It should be understood that this drawing is not to scale and some items normally seen in laser systems have been omitted so that the invention is not obscured.

Still referring to FIG. 2A, a light source 205, typically a laser for providing coherent light to be incident on at least one fiducial mark 215 of at least one structure 220a of two or more structures 220a, 220b. It should be understood that at least one of the two or more structures 220a, 220b should be mounted on a precision (e.g. piezoelectric) structure, referred to generically as a positioner 230 in the application, including but not limited to a translational stage.

Still referring to FIG. 2A, there is also a photosensitive device 235, which receives scattered light from either of 220a and 200b and provides a signal to a feedback algorithm or processor 240 and a controller 250, which serve as a feedback system to control the arrangement of the positioner, so that, for example, the distance "d" is maintained between the structures 220a and 220b. The distance may be maintained for a predetermined period of time.

According to the invention, at least two mechanically independent objects 220a, 220b are at least one of (1) aligned with a picometer-scale precision; and (2) arranged at a differentially stable position for a predetermined amount of time.

While this embodiment the feedback utilized is a proportional gain, it should be noted that the invention and the appended claims are not limited to a proportional feedback, as there can be for example, integral or differential gain used. In operation, a laser light source 205 may strike the fiducial mark (shown by the dots on item 220b) on a structure 220b, and a portion of the light, which is now scattered because of being incident on the fiducial mark or marks, is received by photosensitive device 235. This device generates signals in accordance with the scattered light received and provides it to feedback algorithm or processor 240, which operates as a feedback loop. The feedback algorithm or processor using a proportional output of the signal provides controller 250 with an output that the controller uses to reposition the positioner 230. The controller may leave the positioner in the same location if the structures are still in alignment. However, to keep the distance d accurate, for example, in the picometer-scale range will normally require some degree of repositioning.

The material composition and geometry of the fiducial mark is variable. All that is required is that the mark scatters a detectable amount of incident light. Examples of such marks include about 1000 nm tall, about 1000 nm diameter $SiO_2$ posts, lower profile about 10 nm tall, about 100 nm Au or Si disks; negative features such as about 100 nm deep, about 100 nm pits and even scanning microscope probe tips. By their nature, lenses themselves can serve as fiducial marks.

No fiducial mark is needed to track the position of a lens, as the motion of the laser light that passes through is inherently coupled to the lens. In addition, while a single laser beam can be used and preferably split by a beam splitter for multiple structure alignment and stabilization, in the case of two structure stabilization, at least one light beam should be independently steered (e.g., via a PZT mirror, acousto-optic modulator, 2D translation lens, galvanometer mirror). Alternatively, for two structure stabilization with both structures mounted to independent translation stages, neither laser beam need be steered. The laser beams can be focused with a variety of lenses (e.g., 1.4 NA oil immersion, 0.7 NA air gap). The laser beams can also be of a variety of wavelengths to maximize sensitivity or to penetrate optically opaque substrates. The focused laser light scatters off the mark and can be detected in transmission or reflection geometries by detecting either forward or backscattered light respectively.

The scattered laser light is incident upon one or more photo-sensitive detectors (e.g., quadrant photo diode, position sensitive detector, charge coupled device). The photo-sensitive device(s) outputs an electronic signal which reveals the position of each fiducial mark (and, hence, the position of each structure). These signals are used in a feedback loop which can keep the differential position stable, or to precisely scan the position between the two structures. The bandwidth of the stabilization is restricted by the time it takes to close the feedback loop (in practice this is often limited by mechanical resonances (~1 kHz) of the positioning stage).

For absolute alignment, all fiducial marks are scanned. This process allows the absolute center of each mark to be established and aligned by repositioning the precision translation stage. The feedback loop then maintains the alignment stably.

FIG. 2B shows a schematic for a low-noise stabilized laser that includes an acousto-optic modulator (AOM) for modulation of frequency, or power of a laser beam. The laser output after the AOM travels along fiber 215 then is split by polarizing beam splitter (PBS) 217, wherein a majority of the split beam typically is output to the microscope, with photodiode 235 receiving a portion of the PBS for feedback purposes.

Figure 2C:
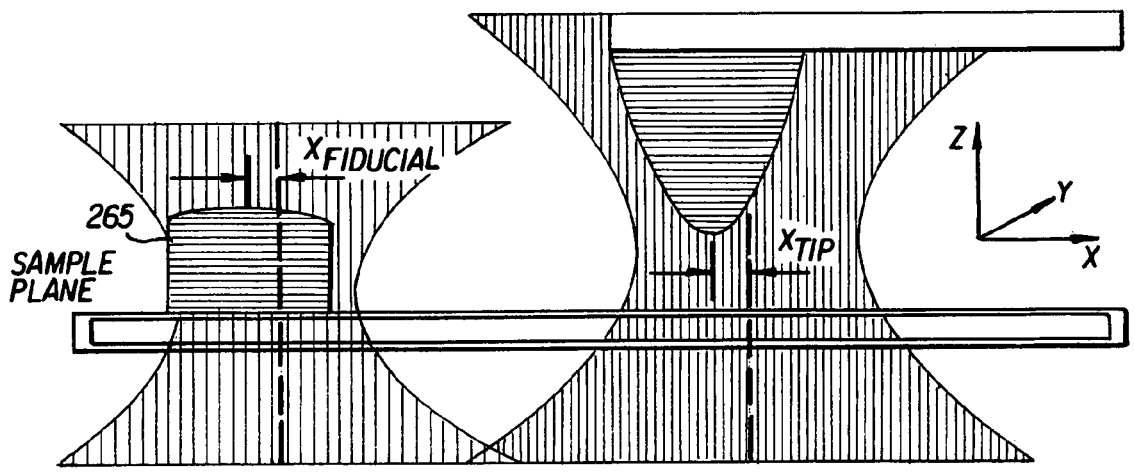
FIG. 2C is a sketch of a sample and a tip using an AFM system.

FIG. 2C shows a sketch of a sample and a tip using an Atomic Force Microscope (AFM) system. Here it can be seen that the sample plane 265 with fiducial marks in an X-direction across the plane. Furthermore, the AFM tip also in an x direction, wherein the tip itself has a fiducial mark. Thus the alignment measurement can be made from a fixed position.

Figure 3A:
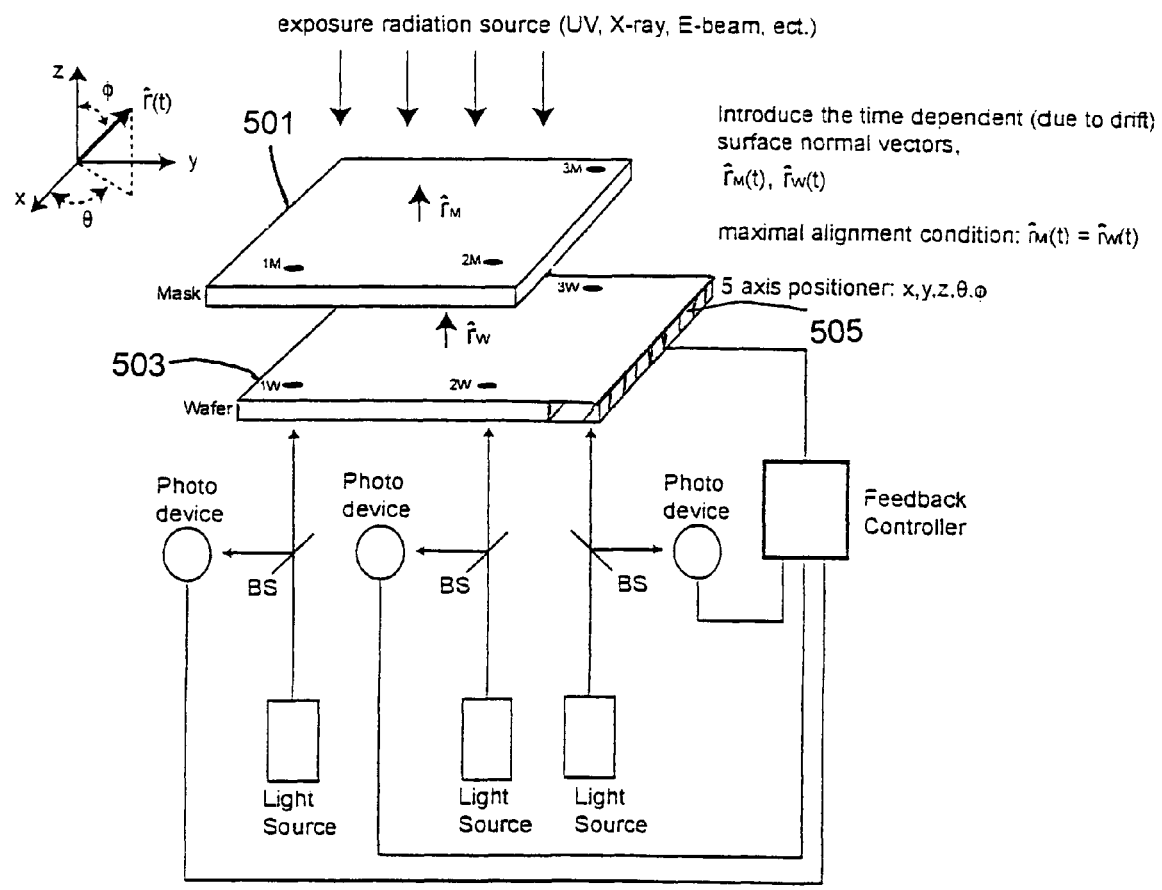
FIGS. 3A and 3B are a respective five axis and three axis stabilization for lithographic applications.
Figure 3B:
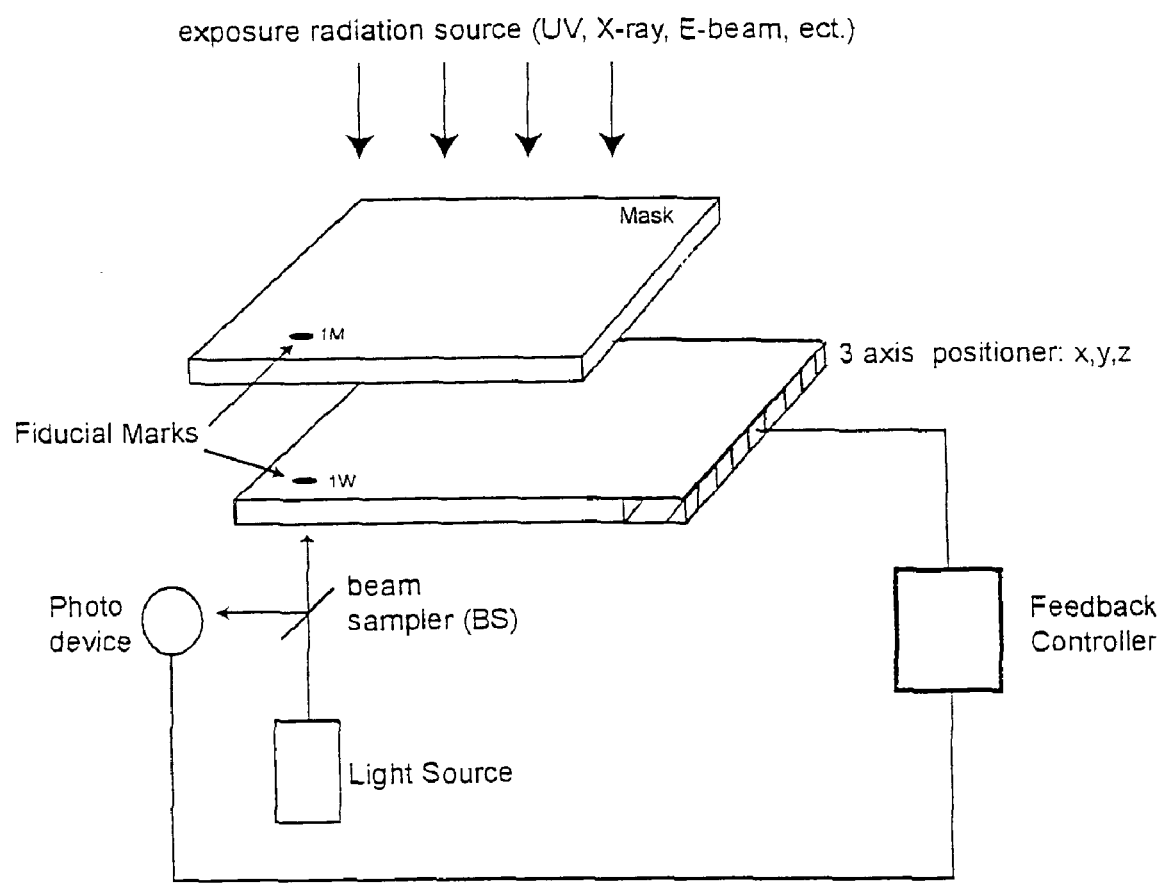

FIGS. 3A and 3B are respective five axis and three axis stabilization configurations for lithographic applications, such as alignment of a mask to a wafer in semiconductor fabrication. In FIG. 3A, an exposure radiation source, such as UV, x-ray, E-beam, etc. passes through a mask and onto a wafer. The positional alignment (e.g., x, y, and z) of the mask 501 to wafer 503 is achieved as described above for aligning two structures. The angular alignment of mask 501 to wafer 503 is described by the surface normal vectors rm and rw. A five axis positioner can position in the x, y, z, Ø and φ directions. An alignment condition is when rm is parallel to the rw. A photodevice with a feedback controller provides feedback to correct rm and rw using multiple fiducial marks. These fiducial marks may be monitored by one or more laser beams. The one or more photo devices communicate with the feedback controller, which can change the positioner direction based on the feedback received.

As minimum feature sizes continue to decrease, nanometer scale drift and alignment is likely to become more and more important in commercial lithographic processing. For example, the next generation deep UV optical process is designed to produce features as small as 30 nm. If a drift rate of 1 nm/s is assumed during a 5 second exposure process, drift alone can yield defects (i.e., uncontrolled features expansion of 20%). This defect percentage will certainly increase as feature sizes continue to decrease. Overlay accuracy will also become increasingly important in future alignment tools. The disclosed method can yield extremely accurate and repeatable alignment between fiducial marks, ~1 nm in absolute accuracy (in 3D) between repeated registrations.

Figure 3C:
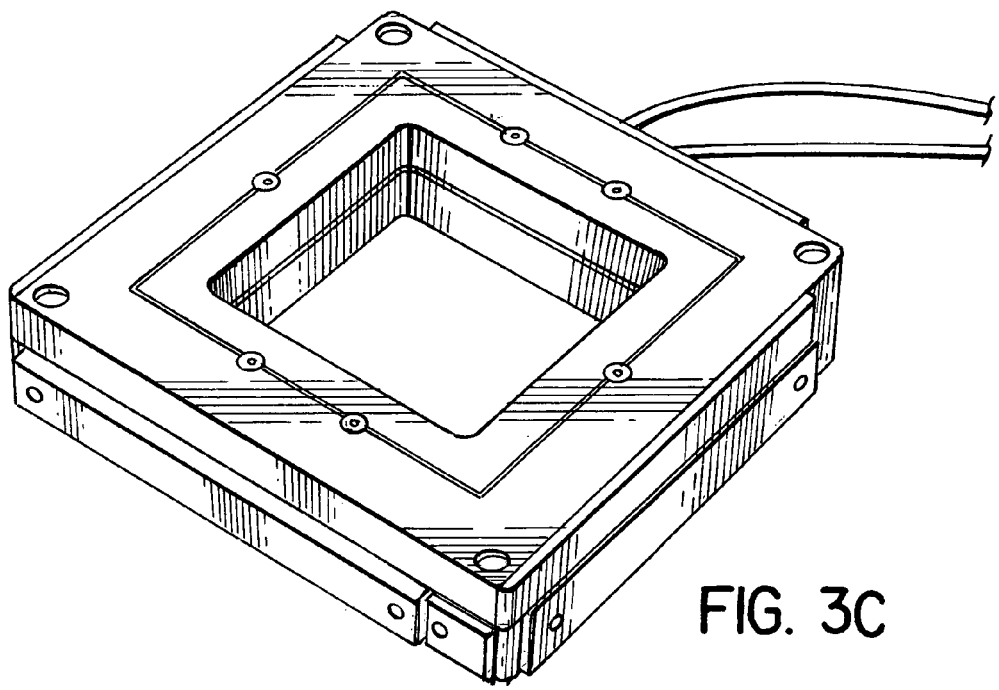
FIGS. 3C and 3D are respective photos of high speed XY(Z) scanning stages and a high-speed, multi-axis nanopositioning system that may be used to practice the present invention
Figure 3D:
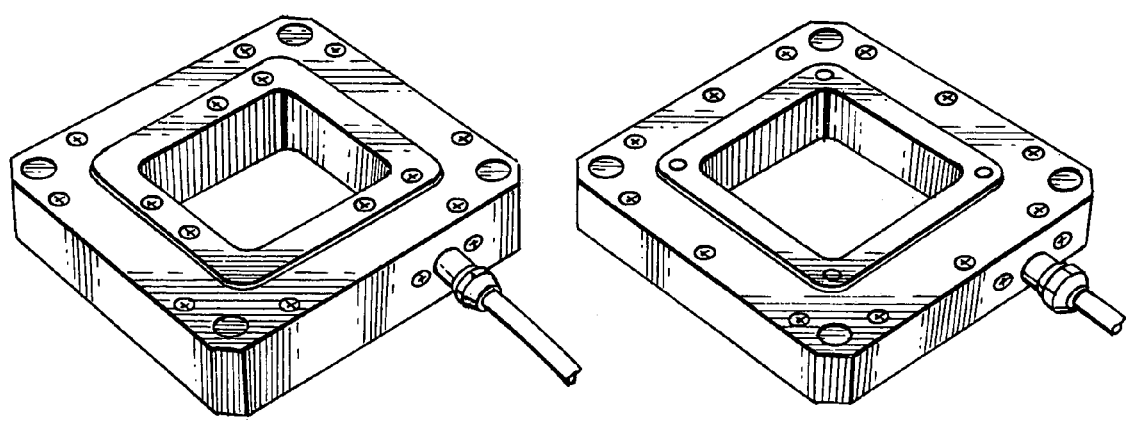

FIGS. 3C and 3D are respective photos of high speed XYZ scanning stages and a high-speed, multi-axis nanopositioning system that may be used to practice the present invention. These items are shown for purposes of illumination and not for limitation. In no way are the appended claims to be limited by the types of positioners shown or not shown in the drawings. The translational stage, which is the preferred positioner, can be a two dimensional or three dimensional stage.

Figure 4A:
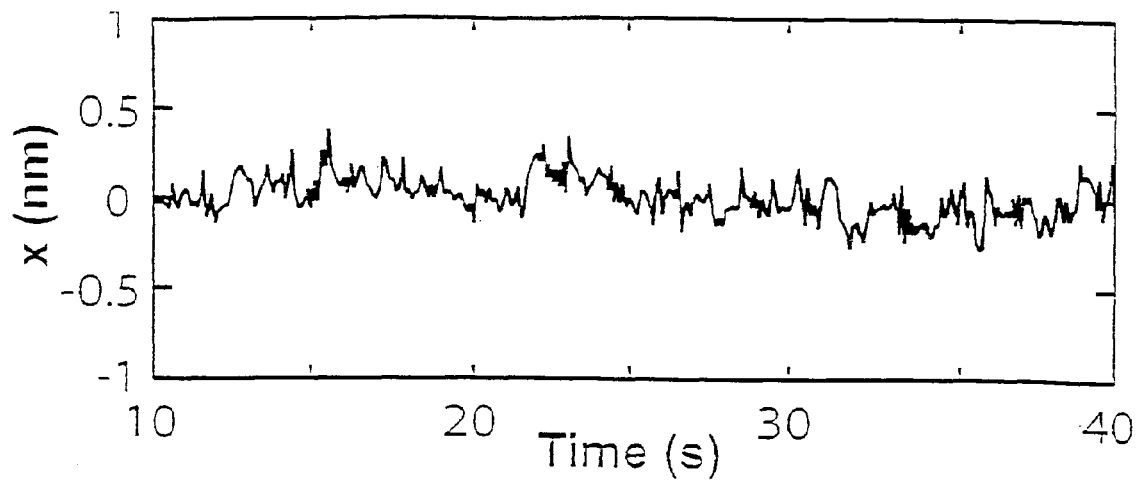
FIGS. 4A, 4B and 4C are respective graphs of microscope stability data in the X, Y and Z directions versus time according to the present invention.
Figure 4B:
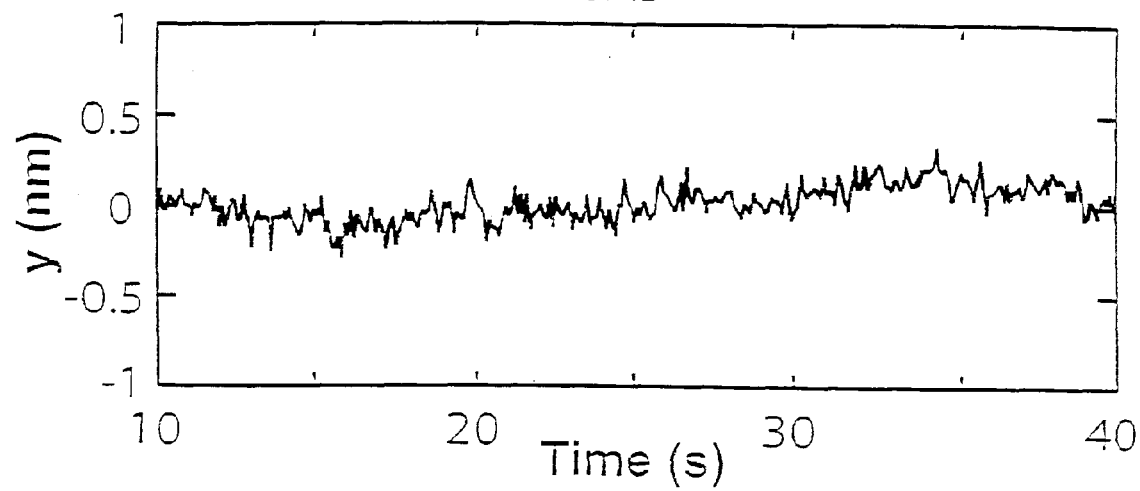
Figure 4C:
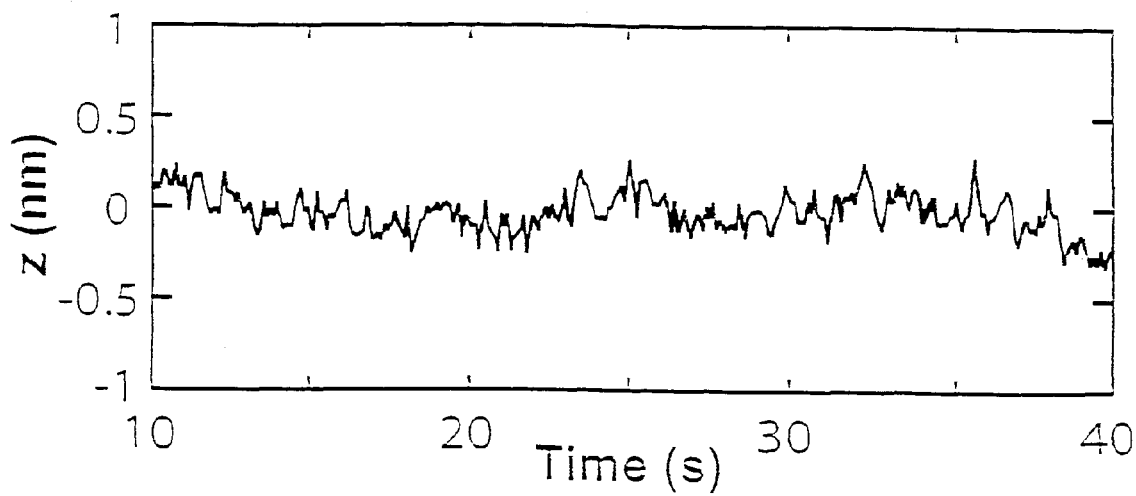

FIGS. 4A, 4B and 4C are respective graphs of microscope stability data in the X, Y and Z directions versus time according to the present invention. The stability for all the directions is all in the picometer-scale range.

Figure 5A:
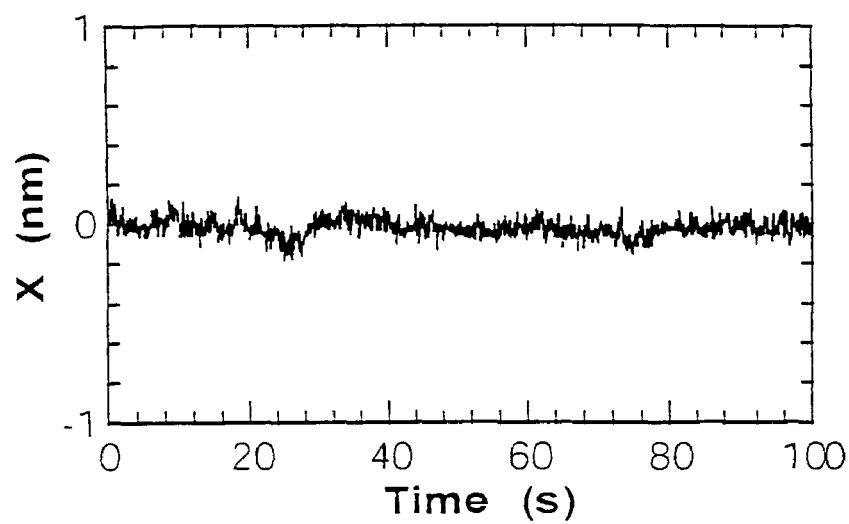
FIGS. 5A, 5B and 5C are respective graphs of AFM tip stability data in the X, Y and Z directions versus time according to the present invention.
Figure 5B:
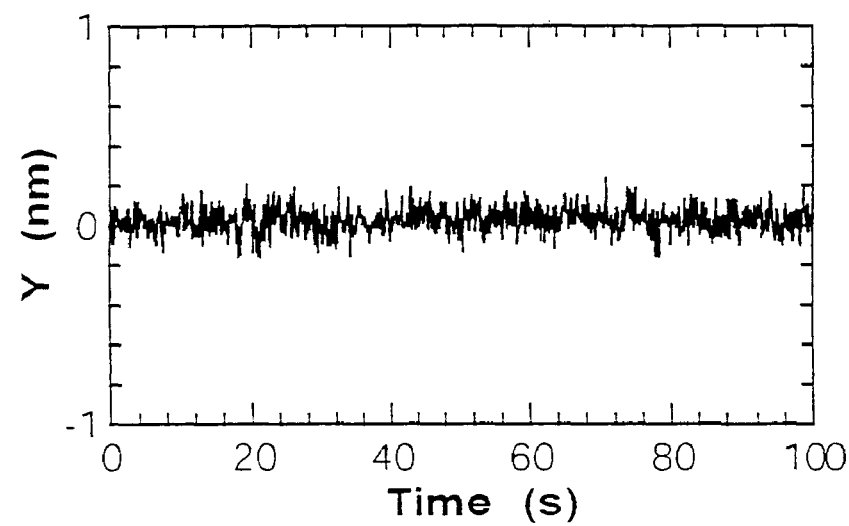
Figure 5C:
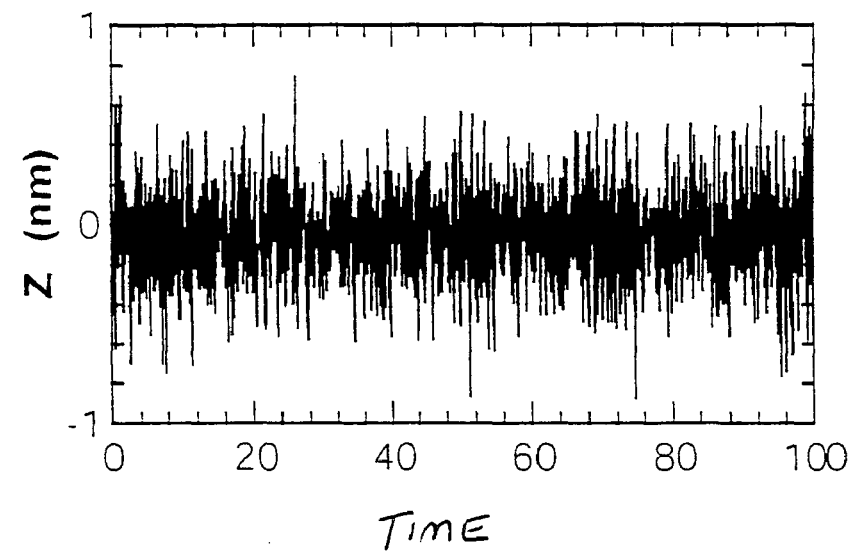

FIGS. 5A, 5B and 5C are respective graphs of AFM stability data in the X, Y and Z directions versus time according to the present invention. It is also shown here that the stability for all of the directions is in the picometer-scale range for all three dimensions.

While the invention has been described with reference to a specific example, a person of skill will certainly be able to achieve many other equivalent forms, all of which will come within the field and scope of the invention. For example, the invention is not limited to laser light, as coherent light can be substituted in place of a laser. A single laser beam could amplitude modulated, allowing for multiplexed detection of separate fiducial marks with a single photosensitive device via lock-in detection. The laser could be pulsed. Alternatively, a comparator could be used instead of a feedback algorithm or processor to compare the signal output from the photosensitive device with a control signal corresponding to a constant amount of separation between the structures. If the actual signal from the photo-sensitive device is within a certain tolerance of the control signal, no repositioning action may be taken. However, if the comparison is out of tolerance or outside of a threshold value, one or both structures can be repositioned until the signal generated by the photosensitive device and input to the comparator is at a desired level. A person of ordinary skill in the art appreciates that the differential or comparison criteria could be any of voltage, current, power, phase, frequency. The photosensitive device could generate optical or electrical signals in response to receipt of the scattered light.

We claim:

1. A method for performing at least one of alignment, stabilization and registration of two or more structures in two or more dimensions with picometer-scale precision and registration by scanning probe microscopy (SPM) comprising the steps of:
    (a) projecting an incident focused laser light on at least one or more fiducial marks on a first structure of said two or more structures to scatter light off at least a first fiducial mark of a first structure;
    (b) projecting an incident focused laser light on at least a second structure of said at least two or more structures to scatter light off at least said second structure, said at least second structure being an SPM tip;

(c) receiving by a photo-sensitive device a portion of the light scattered off the first fiducial mark of the first structure, said photo-sensitive device converting the received scattered light into one of electrical or optical signals, which determine the position of said first fiducial mark;

(d) receiving by a photo-sensitive device a portion of the light scattered off the SPM tip, said photo-sensitive device converting the received scattered light into one of electrical or optical signals, which determine the position of said SPM tip;

(e) providing output control signals that are related to a characteristic of the signal outputs by providing a feedback algorithm/processor for the outputs of the photo-sensitive device, to utilize at least one characteristic of each of the outputs of the photo-sensitive, device to generate the output control signals over a time interval; and, (f) repositioning the first structure by a precision-positioner with respect to the at least second structure until the signals received from the photo-sensitive device and inputs to the feedback algorithm or processor contain attributes within a predetermined range such that an amount of separation determined, in at least two dimensions between at least the first structure and the SPM tip are within a prescribed picometer-scale precision.

2. The method according to claim 1, wherein one or more fiducial marks are embedded to one of said two or more structures.

3. The method according to claim 2, wherein when performing an alignment, an absolute center of each of the one or more fiducial marks is found, and wherein the translational stage is repositioned according to the one or more fiducial marks to align said at least one of said two structures.

4. The method according to claim 2, wherein when performing a registration, a calibration curve is generated by translating a fiducial mark of the one or more fiducial marks through the laser light or the laser light is directed through the fiducial mark to determine a center point, and wherein one of: (i) a known shift is applied between the two or more the structures with respect to each other; and (ii) the structures are scanned relative to each other with picometer-scale precision.

5. The method according to claim 2, wherein when performing stabilization, the positioner comprises a nanopositioning system and the distance separating the two or more structures comprises a picometer-scale precision for a period of time.

6. The method according to claim 2, wherein the photo-sensitive device processes light scattered from the fiducial marks in more than two dimensions.

7. The method according to claim 1, wherein one of forward scattered and back scattered light detection is used, and wherein the feedback comprises one of proportional feedback, integral gain feedback, differential gain feedback or a combination thereof.

8. The method according to claim 2, wherein said at least one structure comprises one of a scanning probe, an atomic force microscopy tip and a surface-feature near said tip.

9. The method according to claim 2, wherein the two or more structures are aligned and angularly stabilized.

10. The method according to claim 2, where the one or more fiducial marks are one of micron-sized or sub micron sized.

11. The method according to claim 2, wherein the two or more structures aligned, stabilized and registered are selected from the group consisting of an Atomic Force Microscope (AFM) tip and a sample, and a Scanning Probe Microscope (SPM) tip and a sample.

12. An apparatus for at least one of alignment, stabilization and registration of a relative position of at least two or more independent structures at picometer-scale precision, said apparatus comprising:

a laser for providing coherent focused light incident on at least one fiducial mark of at least said two or more structures;

a photo-sensitive device for receiving at least a portion of the light scattered off said at least one fiducial mark, wherein said photo-sensitive device generates a signal in response to the scattered light received, which determines the position of said at least one fiducial mark;

a precision-positioner, wherein said positioner can be moved in accordance with the signals generated by the photo-sensitive device's reception of scattered light from said at least one fiducial mark and an SPM tip, so that said two or more structures are at least one of (1) aligned with a position there between in the picometer-scale precision; and (2) arranged at a stable position for an amount of time; and a feedback loop to provide a control signal that controls movement of said positioner, said feedback loop including a feedback algorithm/processor to provide an output signal that is related to a characteristic of the input signal generated by the photo-sensitive device and received by the feedback loop, said positioner being moveable to determine in at least two dimensions, the amount of separation between said at least one fiducial mark and said SPM tip with picometer scale precision.

13. The device according to claim 12, wherein the feedback provides one of proportional feedback, integral gain feedback, differential gain feedback or a combination thereof.

14. The device according to claim 12, wherein the device provides alignment, stabilization, and registration selected from the group consisting of (i) an Atomic Force Microscope (AFM) tip relative to a sample, and (ii) a scanning probe microscope tip relative to a sample.

15. The device according to claim 12, wherein the positioner comprises a translational stage, and wherein the photo-sensitive device reads the fiducial marks in a plurality of dimensions.

16. The device according to claim 12, wherein the positioner comprises one of: (i) an angular stage coupled with a translation stage and (ii) a combined angular-translation stage.

17. The method according to claim 1, wherein laser light of step (a) and the laser light of step (b) emanate from two different lasers.

18. The method according to claim 1, when a laser beam is split to the center the incident laser light of step (a) and the incident laser light of step (b).

* * * * *